(12) United States Patent
Iyer et al.

(10) Patent No.: US 8,230,207 B2
(45) Date of Patent: Jul. 24, 2012

(54) SYSTEM AND METHOD OF PROVIDING SECURITY TO AN EXTERNAL ATTACHMENT DEVICE

(75) Inventors: Sree M. Iyer, San Jose, CA (US); Nicholas A. Antonopoulos, San Jose, CA (US); Santosh Kumar, Santa Clara, CA (US)

(73) Assignee: MCM Portfolio LLC, Cupertino, CA (US)

( * ) Notice: Subject to any disclaimer, the term of this patent is extended or adjusted under 35 U.S.C. 154(b) by 0 days.

(21) Appl. No.: 12/893,232

(22) Filed: Sep. 29, 2010

(65) Prior Publication Data

US 2011/0087889 A1    Apr. 14, 2011

Related U.S. Application Data

(63) Continuation of application No. 11/782,618, filed on Jul. 24, 2007, now abandoned, which is a continuation-in-part of application No. 11/669,092, filed on Jan. 30, 2007, now abandoned, and a continuation-in-part of application No. 11/689,467, filed on Mar. 21, 2007.

(60) Provisional application No. 60/939,030, filed on May 18, 2007.

(51) Int. Cl.
*G06F 9/00* (2006.01)
*G06F 12/14* (2006.01)
*G06F 9/24* (2006.01)
*G06F 11/30* (2006.01)

(52) U.S. Cl. ............ 713/1; 726/1; 726/2; 726/9; 726/20; 713/2; 713/193; 713/194

(58) Field of Classification Search ........................ None
See application file for complete search history.

(56) References Cited

U.S. PATENT DOCUMENTS

| 5,623,637 | A  | * | 4/1997  | Jones et al.    | 711/164 |
|-----------|----|---|---------|-----------------|---------|
| 7,370,166 | B1 | * | 5/2008  | Ramesh et al.   | 711/163 |
| 2005/0193188 | A1 | * | 9/2005  | Huang        | 713/1   |
| 2006/0069840 | A1 | * | 3/2006  | Corbett et al.  | 710/313 |
| 2006/0264089 | A1 | * | 11/2006 | Lin          | 439/378 |
| 2008/0200071 | A1 | * | 8/2008  | Barras        | 439/660 |

* cited by examiner

*Primary Examiner* — Nathan Flynn
*Assistant Examiner* — Trang Doan
(74) *Attorney, Agent, or Firm* — Edward P. Heller, III (57) ABSTRACT

Systems and methods of providing security to an external Serial Advanced Technology Attachment (SATA) device are described herein. A controller is connected between the eSATA device and the computing device. On startup, the controller presents a first partition of eSata device as a Read Only Memory, e.g., CD-ROM, but at the same time it restricts access of the computing device to a second partition of the eSata device until receiving a valid identity authentication. The second partition is preferably encrypted with a key stored on a first partition. Decryption is performed in the controller as part of presenting the eSata device. The authentication process is preferably stored in the first partition and downloaded to the computing device on startup.

8 Claims, 10 Drawing Sheets

SYSTEM AND METHOD OF PROVIDING SECURITY TO AN EXTERNAL ATTACHMENT DEVICE

CROSS-REFERENCE TO RELATED APPLICATIONS

The present application is a continuation of U.S. patent application Ser. No. 11/782,618, filed Jul. 24, 2007, which application further claims priority to U.S. Provisional Patent Application Ser. No. 60/939,030 entitled "Device, System and Method for Further Enhanced Operation of an eSata Device with a Host System," which was filed on May 18, 2007, the contents of which were expressly incorporated therein by reference. In addition, the present application is related to co-pending U.S. patent application Ser. No. 11/782,613, entitled "Method and Apparatus of Providing Power to an External Attachment Device via a Computing Device," which was filed on Jul. 24, 2007, with the same assignee as the present disclosure. The disclosure of the above-identified application was incorporated in its entirety in parent application Ser. No. 11/782,618. In addition, this application is a continuation-in-part of co-pending U.S. patent application Ser. No. 11/669,092, filed Jan. 30, 2007; and Ser. No. 11/689,467, filed Mar. 21, 2007; the entire contents of both are expressly incorporated herein by reference.

TECHNICAL FIELD

The present disclosure relates generally to a system and method of providing security to an external Serial Advanced Technology Attachment device, and in particular to providing security to an external Serial Advanced Technology Attachment (eSATA) storage device.

BACKGROUND

External storage devices may often be used to backup data on another storage device, for example, from data stored on an internal storage device of a desktop computer and/or a laptop computer. External storage devices are connected to a computing device via various types of ports, such as a USB port, an eSATA port, a FireWire port, etc. Further, external storage devices may frequently be hot-swappable, i.e. the external storage devices can be removed and connected to the computing device while it is powered on.

Thus, in addition to backing up data, external storage devices can also be used to transport data from one computing device to another, further facilitated by scaling of external devices and the need for portable digital data.

However, the ease with which portable devices such as notebooks, portable storage devices, etc. are lost has become a threat to data security and personal privacy. Loss of portable storage devices may have detrimental consequences due to, for example, loss of privacy of personal and/or medical information, financial loss, and identity theft.

SUMMARY OF THE DESCRIPTION

Systems and methods of providing security to an external Serial Advanced Technology Attachment (eSATA) device are described herein. Some embodiments of the present disclosure are summarized in this section.

One embodiment includes a method, which may be embodied on a system, of creating a first partition of an external Serial Advanced Technology Attachment storage device, presenting to a computing device, the first partition of the external Serial Advanced Technology Attachment storage device, as a Read Only Memory; restricting the computing device from accessing a secured second partition of the external Serial Advanced Technology Attachment storage device; and in response to receiving a valid identity authentication, unrestricting access to the second partition of the external Serial Advanced Technology Attachment storage device.

In one embodiment, in response to receiving a logon request from the computing device, an identity authentication process is initiated, wherein the process is stored on the first partition. Furthermore, in one embodiment, a process stored on a disk controller receives an encryption key from the process stored on the first partition of the Serial Advanced Technology Attachment storage device, and the process stored on the disk controller uses the encryption key to decrypt the second partition of the Serial Advanced Technology Attachment storage device.

The present disclosure includes methods and apparatuses which perform these methods, including processing systems which perform these methods, and computer readable media which when executed on processing systems cause the systems to perform these methods.

Other features of the present invention will be apparent from the accompanying drawings and from the detailed description which follows.

BRIEF DESCRIPTION OF THE DRAWINGS

The disclosure is illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present disclosure include systems and methods of providing security to an external storage device.

An external device can communicate with a computing device via one or more interface ports of a computing device. The interface ports can be one of many interfaces, such as, a USB interface, a FireWire (IEEE 1394) interface, and/or an eSATA interface, etc. External storage devices may additionally be connected to a disk controller to be coupled to one or more interface ports of the computing device. The type of disk controller depends on the interface of the external storage device. The disk controller can be a device separate from the motherboard or built into the motherboard.

For example, a SATA storage device can be connected to a controller to be coupled to an eSATA port of the computing device. In one embodiment, the controller includes a software instance to present a SATA storage device coupled to the controller as multiple devices to the computing device. Thus, the computing device may see the SATA storage device as multiple storage devices, i.e., as separate drives.

In one embodiment, the controller presents one of the partitions of the SATA storage device 40 the computing device as a bootable CD-ROM (e.g., a disk image or .ISO file) to the operating system of the computing device. The controller initially blocks access to, and a second partition of the SATA storage device is initially locked (e.g., secured or encrypted). The second partition of the SATA storage device may not be identified by the computing device while the second partition of the SATA storage device is locked.

When a request to logon to the computing device or to access the SATA storage device is received, the CD-ROM partition of the SATA storage device includes an executable that can be automatically initiated. In one embodiment, the executable includes a security application for identification purposes. For example, the security application can initiate a logon procedure to a user such that a user's identity is verified, via submission of various identifiers including, RFID, passwords, and/or other biometrics identifiers such as finger prints, etc.

Once the identification procedure has been completed, the security application on the CD-ROM partition of the SATA storage device acknowledges the completion to the controller. Thus, in one embodiment, the software instance on the controller unlocks (e.g., decrypts) the second partition of the SATA storage device, and presents it as a separate drive. The second partition then becomes visible and accessible to the operating system and the computing device. In some instances, the security application sends a security key (e.g., encryption key) to the software instance for unlocking (e.g., decrypting) the second partition of the SATA storage device.

Figure 1A:
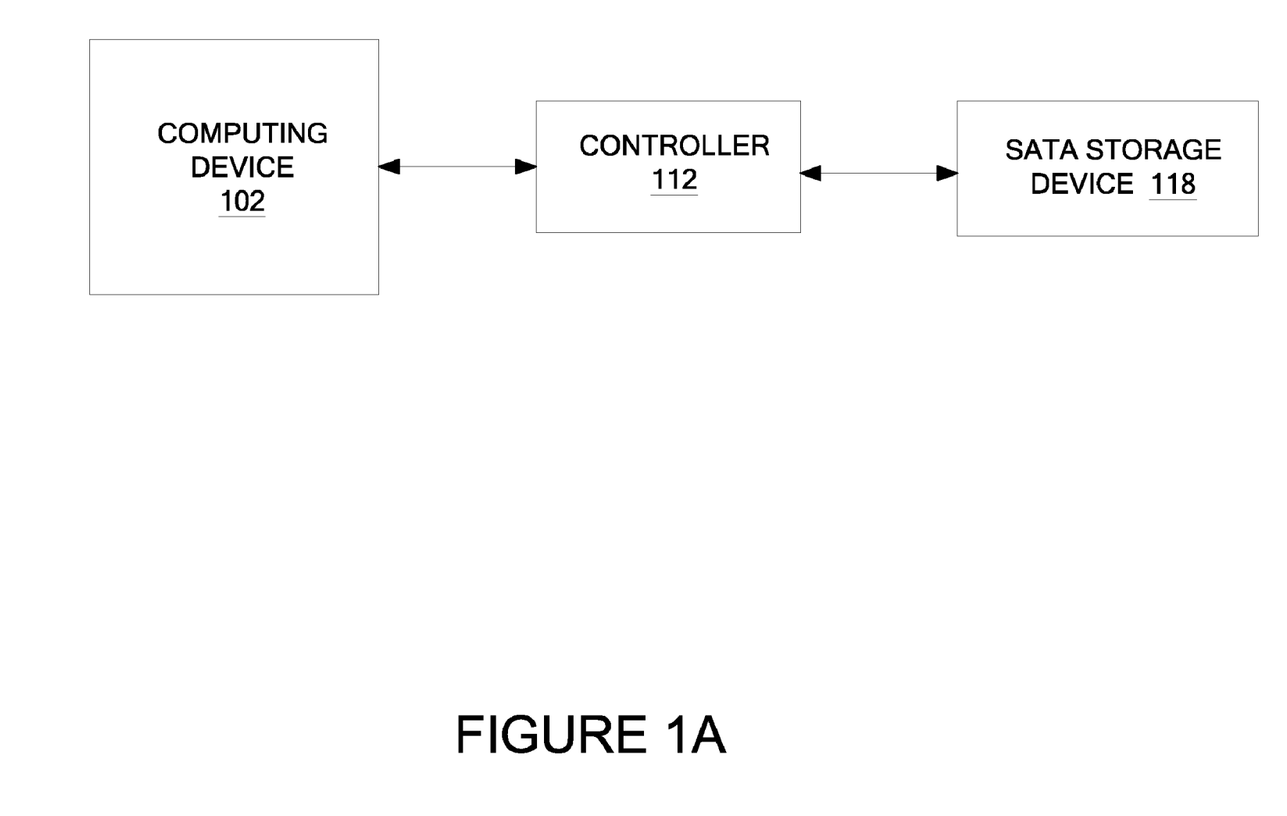
FIG. 1A illustrates an external attachment that communicates with a computing device through a controller, according to one embodiment.

FIG. 1A illustrates a SATA storage device 118 that communicates with a computing device 102 through a controller 112, according to one embodiment. In one embodiment, the controller 112 interfaces with the computing device via an eSATA connection to utilize an interconnection of relatively longer length. The controller 112 can interface with the external SATA storage device using an eSATA connection or SATA based connections. Furthermore, the SATA storage device, as described and illustrated herein, includes either an external SATA storage device (e.g., eSATA) or other SATA devices that support the transfer of data at 1.5 Gbps, 3 Gbps, or higher.

In one embodiment, the computing device 102 is a computing device able to be coupled to a SATA storage device (e.g., the SATA storage device 118). For example, the computing device 102 may include a chipset to support the SATA interface protocol. The computing device may also have an external port that can be connected to a SATA storage device.

Alternatively, the computing device can have a PCI based SATA controller mounted to the motherboard with an eSATA port accessible from a panel external to the chassis (e.g., a bracket connector). A SATA device can therefore connect to the computing device through the eSATA controller card via the externally accessible eSATA port.

The computing device 102 can be a laptop computer (e.g., notebook or portable computer) that utilizes a PCMCIA based controller having eSATA interfacing capabilities. In some instances, the eSATA interface protocol capability may be provided with a PCI-Express card. The computing device 102 can be any of a PDA, a laptop, a desktop computer, a telephone, a cellular phone, a portable device, and/or a server device, etc.

The controller 112 is a chip associated with circuitry to control a storage device. The controller can be built-in to a motherboard or be included in a stand-alone device that is separate from the motherboard. In general, the controller 112 can have one or more of many interfaces such as, an IDE (PATA) interface, an EIDE interface, a SCSI interface, a SATA interface, and/or an eSATA interface. For example, the controller 112 can be coupled to the SATA storage device 118. In one embodiment, the controller 112 has an IDE/EIDE interface to be coupled to an IDE to eSATA converter, such that the controller is able to communicate with the SATA storage device.

Figure 1B:
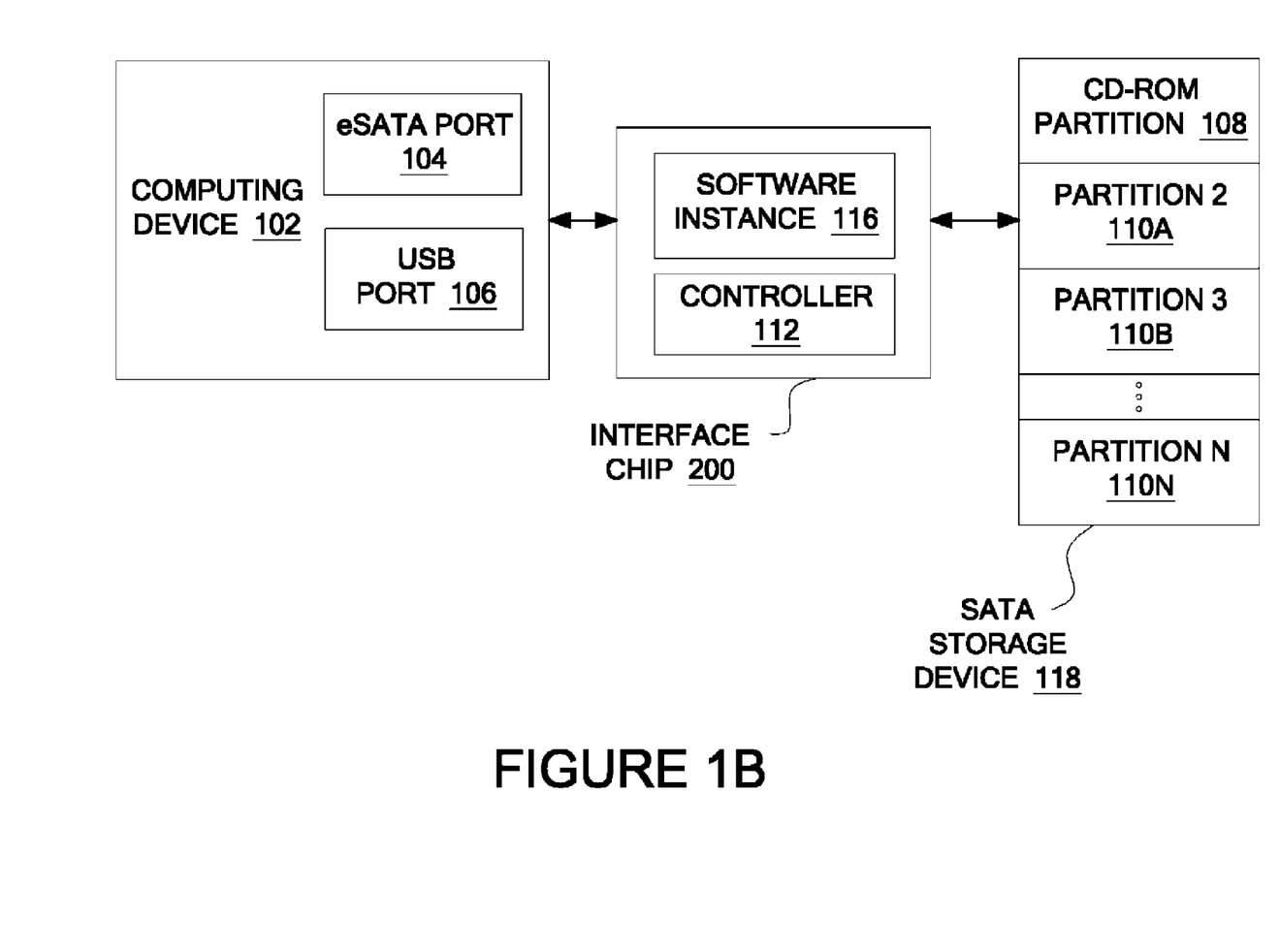
FIG. 1B illustrates a SATA storage device that communicates with a computing device through an interface chip, via an eSATA port and a USB port of the computing device, according to one embodiment.

FIG. 1B illustrates a SATA storage device 118 that communicates with a computing device 102 through an interface chip 200, via an eSATA port 104 and a USB port 106 of the computing device 102, according to one embodiment.

The computing device 102 can include multiple interface ports such as the USB port 106 and/or the eSATA port 104. The eSATA and/or USB connectivity can either be built-in to the motherboard or added-on through an external PCI bracket (e.g., a host bus adaptor, or HBA) or card-based controllers. The computing device may also have additional ports other than USB ports or eSATA ports, such as FireWire (IEEE 1394) ports that are not shown in the figure.

In one embodiment, the interface chip 200 is coupled to the eSATA port 104, and the USB port 106 of the computing device. The USB port 106 of the computing device 102 can supply power to the interface chip 200 and/or the SATA storage device 118 connected to the interface chip, whereas the eSATA port 104 of the computing device can be used for data transmission to/from the SATA storage device 118.

In one embodiment, the interface chip 200 includes a software instance 116 that is executable by a controller 112 of the interface chip 200. The software instance 106 can present the SATA storage device 118 as multiple partitions 108-110A-N to an operating system of the computing device. The operating system can be any of Windows, Mac OSX, Linux, Unix, MacroS, etc.

In one embodiment, one of the partitions 108 of the SATA storage device 118 is a virtual CD-ROM partition including a bootable .ISO file (e.g., CD image). The additional partitions 110A-N may be secured, and remain so until completion of an authentication process.

In one embodiment, the secured partitions 110A-N (e.g., the partitions can be encrypted) are not visible (not presented) to the operating system of the computing device, and become operable for data access and storage only when unlocked (e.g., decrypted).

The bootable .ISO file in the first partition 108 of the storage device 118 can be launched in response to a request to logon to the computing device and/or a request to access the SATA storage device. In one embodiment, the bootable .ISO file includes a security application to verify the identity of the user requesting system and/or storage device access. In one embodiment, the security application presents an interface for password entry. In other embodiments, one or more types of identity verification such as RFID, fingerprinting or other biometrics identifiers, passwords, voice recognition, etc., can be used.

Once the security application has verified the user's identity, a command can be sent to the controller 112 indicating the user's identity has been verified. In one embodiment, the command sent to the controller 112 may include a security key (e.g., an encryption/decryption key) for unlocking the one or more secured partitions 110A-N of the SATA storage device. In one embodiment, the software instance 106 unlocks the one or more secured partitions 110A-N of the SATA storage device and presents the unsecured partitions 110A-N to the operating system. The unsecured partitions 110A-N of the SATA storage device can then be accessed by the user.

Figure 2A:
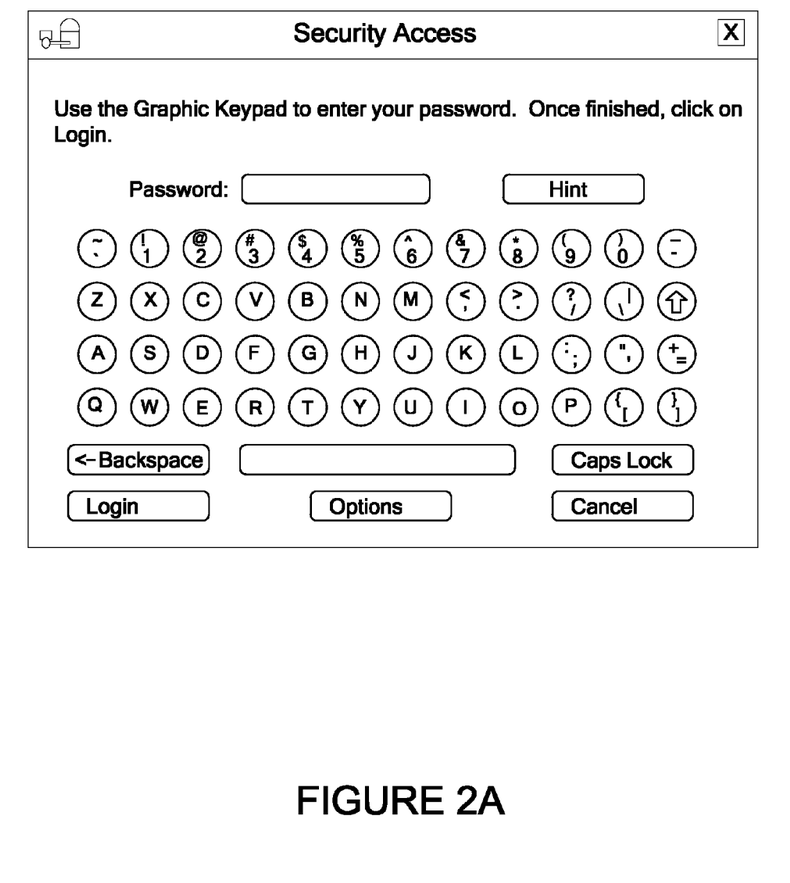
FIG. 2A illustrates an example screenshot of an interface for identify verification via password submission, according to one embodiment.

FIG. 2A illustrates an example screenshot of an interface for identity verification via password submission, as provided by the security application, according to one embodiment.

The interface is launched by the security application stored in the first partition of the SATA storage device. In one embodiment, the interface prompts the user to provide a password in the password field. The password can be entered via the on-screen keyboard as displayed. In one embodiment, the password can be entered via a physical keyboard. The password can be used to verify the user's identity prior to unlocking one or more secured partitions of the SATA storage device to be accessed by the user. In other embodiments, identifiers such as an RFID, voice identifiers, biometric identifiers such as fingerprints can be used to verify the user's identity.

Figure 2B:
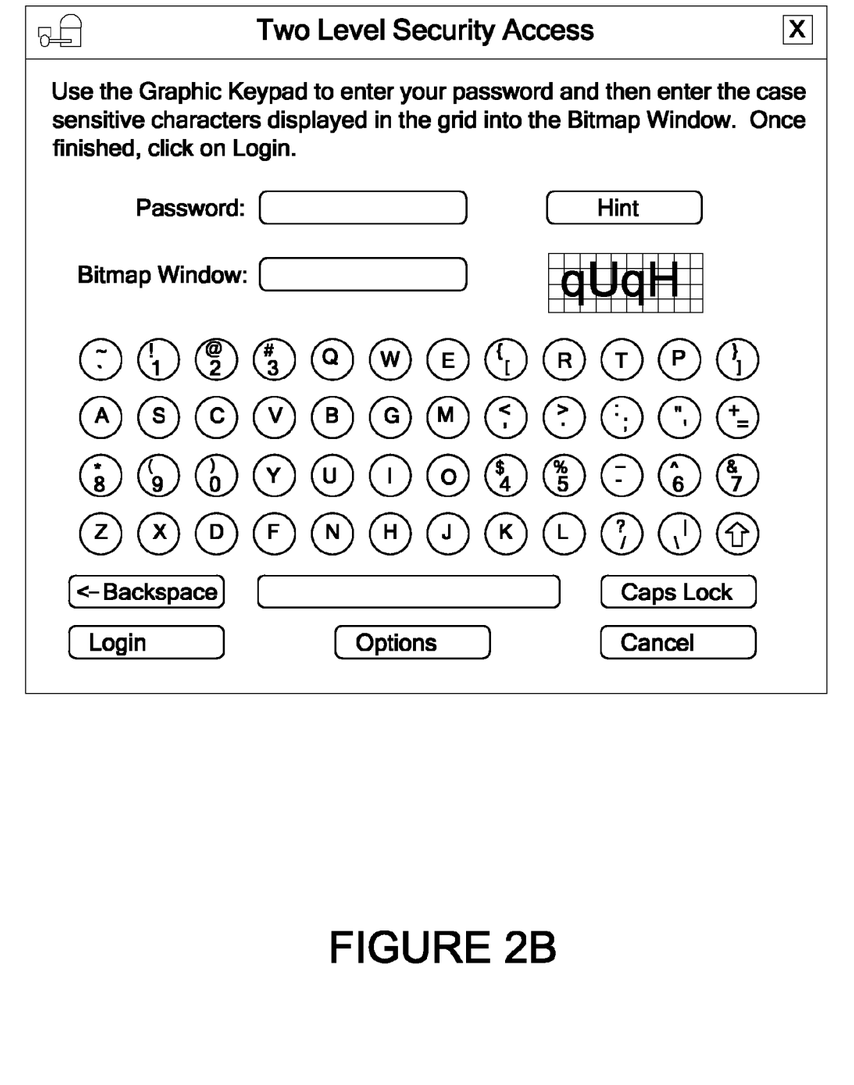
FIG. 2B illustrates another example screenshot of an interface for identity verification via password submission, according to one embodiment.

FIG. 2B illustrates another example screenshot of an interface for identity verification via password submission, according to one embodiment.

In one embodiment, the interface includes an additional field for entering a second code in addition to the password. The second code may be displayed on the interface in a non-machine readable format (e.g., a scrambled bitmap) to be read by the user and entered into the 'bitmap window' field.

Figure 3A:
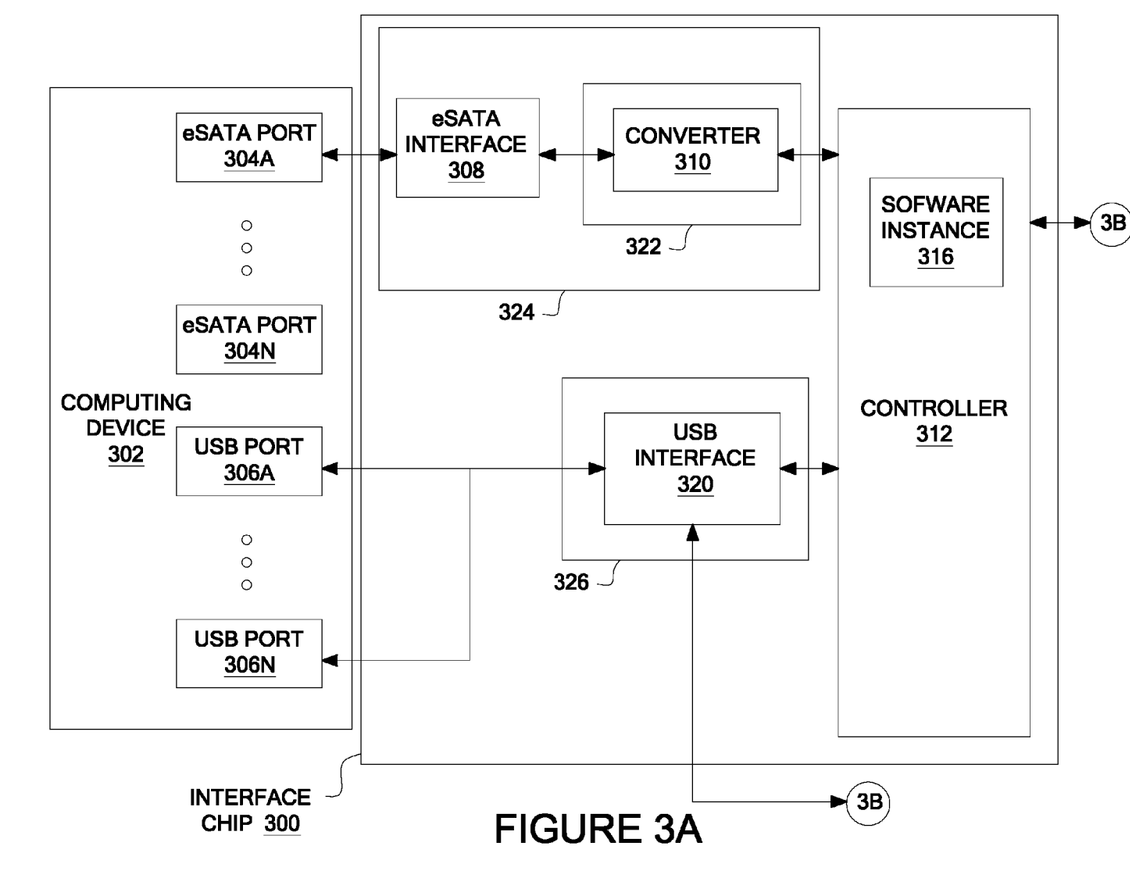
FIG. 3A illustrates an example of an interface chip to communicate with a computing device via a plurality of ports of the computing device, according to one embodiment.

FIG. 3A illustrates an example of an interface chip to communicate with a computing device via a plurality of ports of the computing device, according to one embodiment. The computing device 302 can include multiple interface ports such as USB ports 306A-N and/or eSATA ports 304A-N. The computing device may also have ports other than USB ports and/or eSATA ports, such as FireWire ports that are not shown in the figure.

In one embodiment, the interface chip 300 includes the controller 312. The interface chip 300 may further include an eSATA interface 308, a converter 310, and/or an USB interface 320. Even though the eSATA interface 308 and the converter 310 as illustrated in 304, are shown to be internal to the chip interface 300, in some embodiments, the eSATA interface 308 and the converter 310, are external to the interface chip 300. Alternatively, in some embodiments, the eSATA interface 308 is external to the interface chip 300 and the converter 310 is internal to the interface chip 300. Similarly, the USB interface 320 can be external or internal to the interface chip 300.

In one embodiment, the controller 312 is coupled to at least one eSATA port 304, and at least one USB port 306 via an eSATA interface 308 and a USB interface 320, respectively. The USB interface 320 can supply power to the controller 312 from one or more USB ports 306 of the computing device.

In some embodiments, multiple USB ports 306 can be utilized, depending on the power requirements of the controller 312 and/or the SATA devices (e.g., storage devices) coupled to the controller. The number of USB ports utilized to power the SATA devices can depend on one or more of the following metrics, such as the number of active SATA devices (e.g., SATA storage devices), power supply/consumption of the computing device, and/or the data rate of the eSATA interface port (e.g., 1.5 Gbps, 3.0 Gbps, or 6.0 Gbps).

Figure 3B:
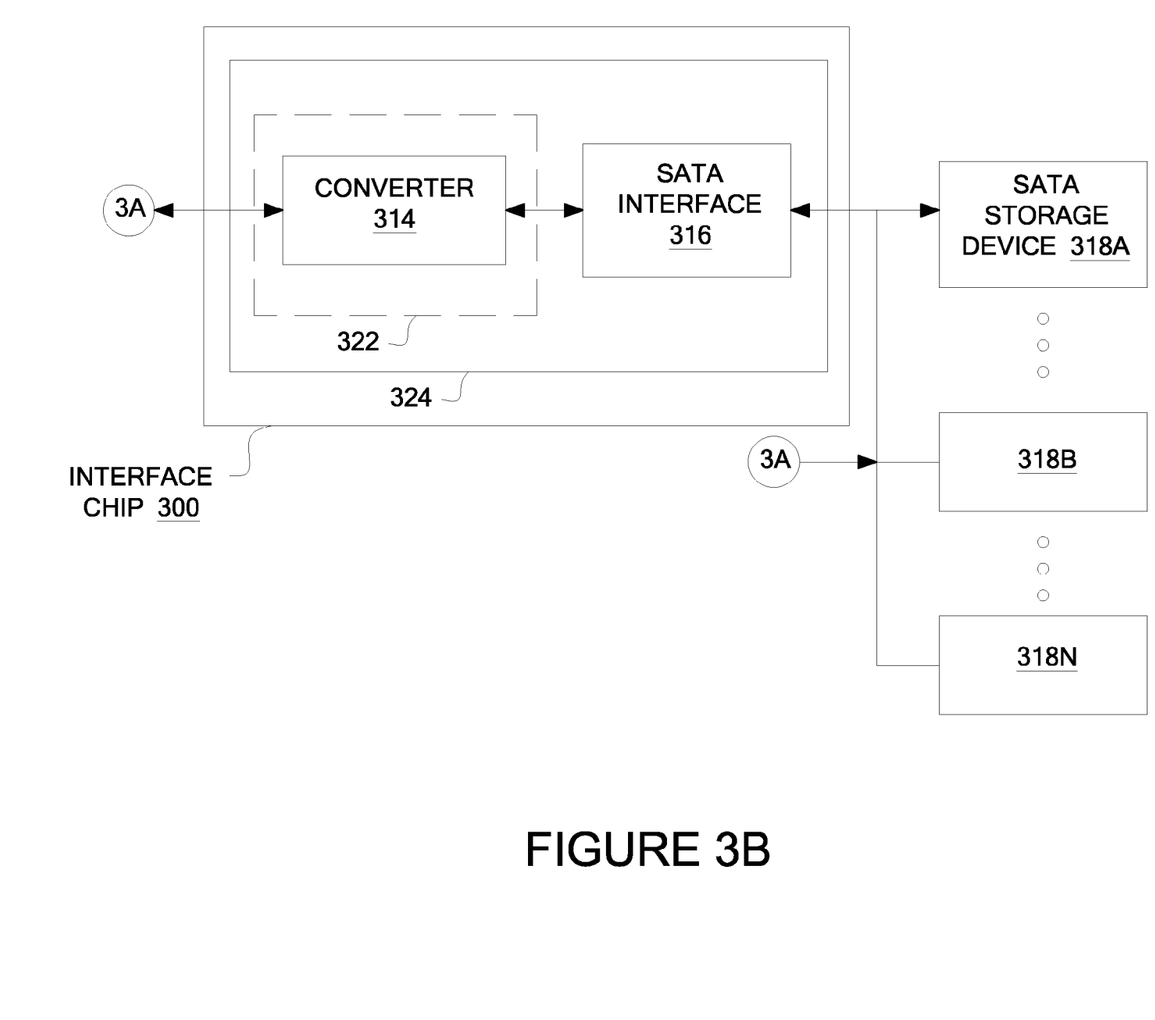
FIG. 3B illustrates an example of a plurality of SATA storage devices coupled to an interface chip to communicate with the computing device of FIG. 3A, according to one embodiment.

FIG. 3B illustrates an example of a plurality of SATA storage devices coupled to an interface chip to communicate with the computing device of FIG. 3A, according to one embodiment. In one embodiment, the interface chip 300 is connected to one or more SATA storage devices 318A-N. In one embodiment, the USB interface 320 is to provide a pathway through which the computing device can supply power to the one or more SATA storage devices coupled to the interface chip 300 via the one or more USB ports 306A-N. The USB interface 320 can be internal or external to the controller 312.

The converters 310 and 314 illustrated in 322 in FIGS. 3A-3B may be provided to translate signals transmitted between the controller and the SATA protocol (e.g., either between the controller and the eSATA port 304 of the computing device or between the controller and the SATA device 318). The conversion is needed for the embodiment of the controller being compatible with an interface standard other than the SATA protocol. For example, the controller 312 can be a controller that is compatible with the IDE (or PATA) protocol. Thus, the converters 310 and 314 translate the data entering and leaving the IDE controller.

In one embodiment, the controller 312 is a SATA controller. Thus, the converters 310 and 314 need not be present for coupling data between the controller and the eSATA port and the SATA devices, respectively. Similarly, the eSATA interface 308 can be internal or external to the controller.

Figure 4:
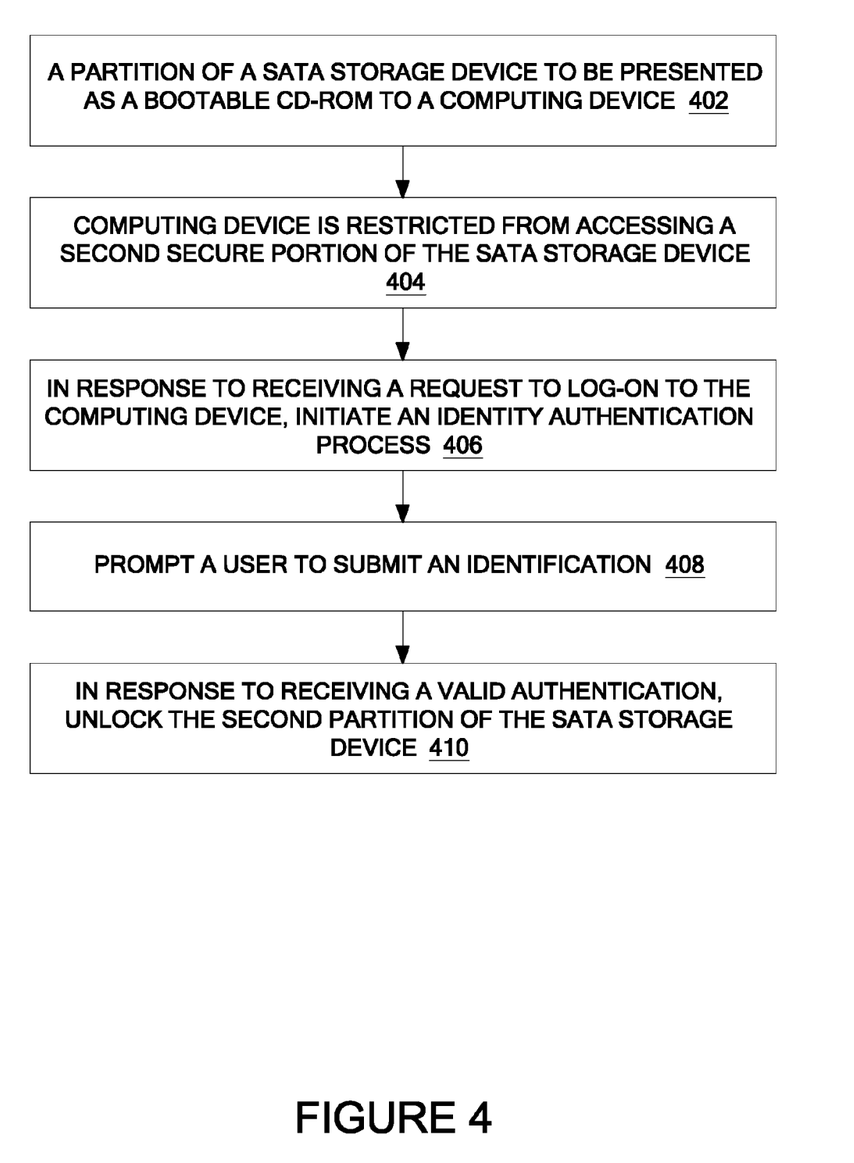
FIG. 4 is a flow chart illustrating a process to provide secured access to one or more SATA storage devices, according to one embodiment.

FIG. 4 is a flow chart describing a process to provide secured access to one or more SATA storage devices, according to one embodiment.

In process 402, a partition of a SATA storage device is presented to the computing device as a bootable CD-ROM. In one embodiment, the bootable CD-ROM partition includes a .ISO file (e.g., disk image) having a security application to verify a user's identity.

In process 404, the computing device is restricted from accessing a second secured partition of the SATA storage device. When unrestricted, the second partition can be a data drive to be used and accessed by the operating system and/or the user. In some embodiments, multiple secured partitions can be provided within the SATA storage device.

In one embodiment, data stored in the second partition of the SATA storage device is encrypted via an encryption algorithm by a software instance stored on the controller (e.g., disk controller). Various encryption algorithms (e.g., 3DES, Blowfish, DES-X, and/or AES, etc.) may be used. In one embodiment, the encryption key is stored on the first partition of the SATA storage device. In other embodiments, the encryption key is stored on the software instance of the controller.

In process 406, an identity authentication process is launched in response to receiving a request to logon to the computing device, or when the computing device attempts to access data from the SATA storage device. The identity authentication process can be initiated by the security application, stored in the first partition of the SATA storage device. In process 408, the identity authentication process prompts the user to submit one or more valid identifiers for identity verification, such as an RFID, a password, and/or a biometric identifier such as a fingerprint.

In response to receiving the valid identity authentication, in process 410, the secured second partition of the SATA storage device is unsecured (e.g., decrypted) and the computing device is given access to the data stored in the second partition. In one embodiment, the second partition is unsecured by the software instance on the controller. The security application stored on the first partition of the SATA drive performs the identity verification, and in one embodiment, sends a command to the software instance indicating that the user's identity has been verified. The command may additionally include the encryption key for unlocking one or more secured partitions of the SATA storage device.

Figure 5:
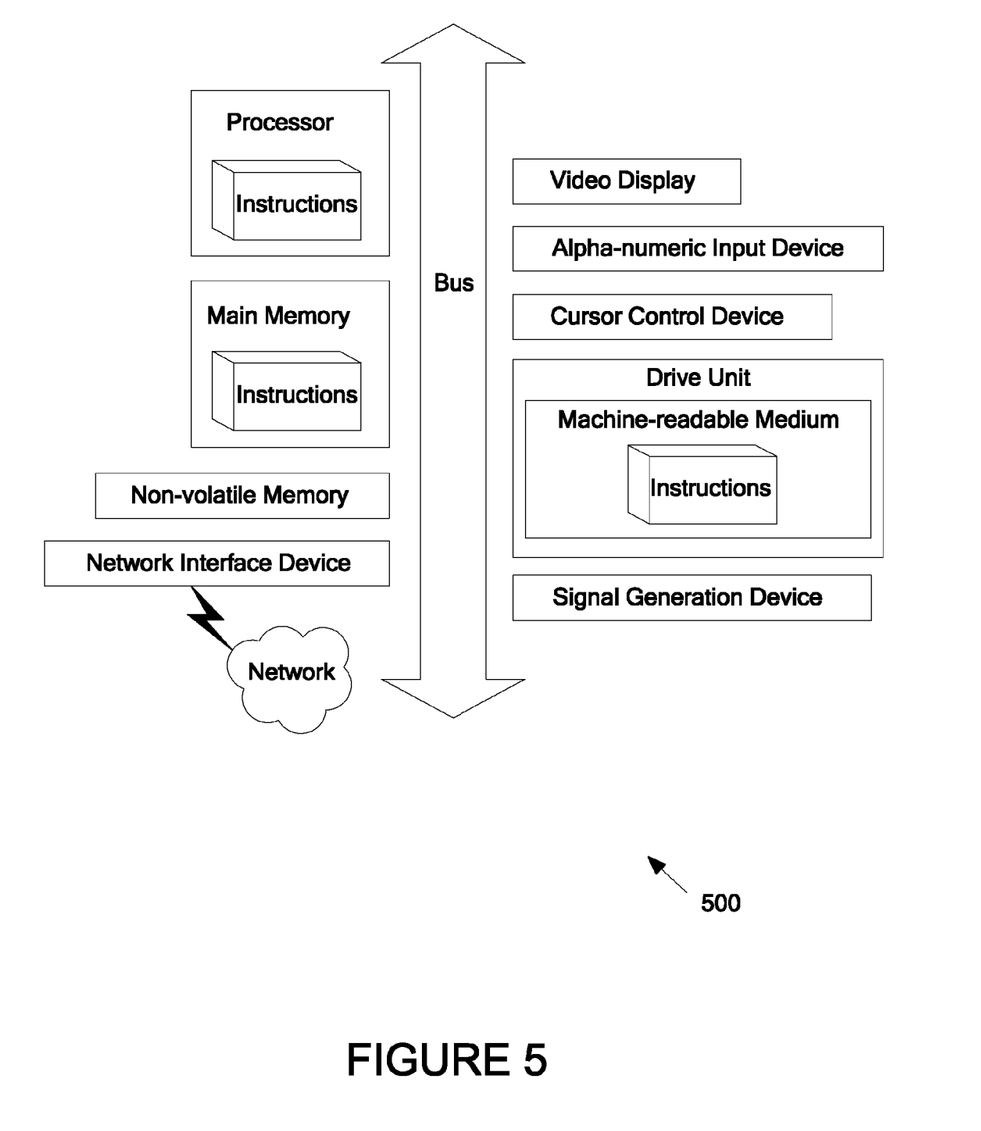
FIG. 5 illustrates a block diagram of a machine-readable medium, according to one embodiment.

FIG. 5 shows a diagrammatic representation of a machine in the exemplary form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment. The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine.

Figure 6:
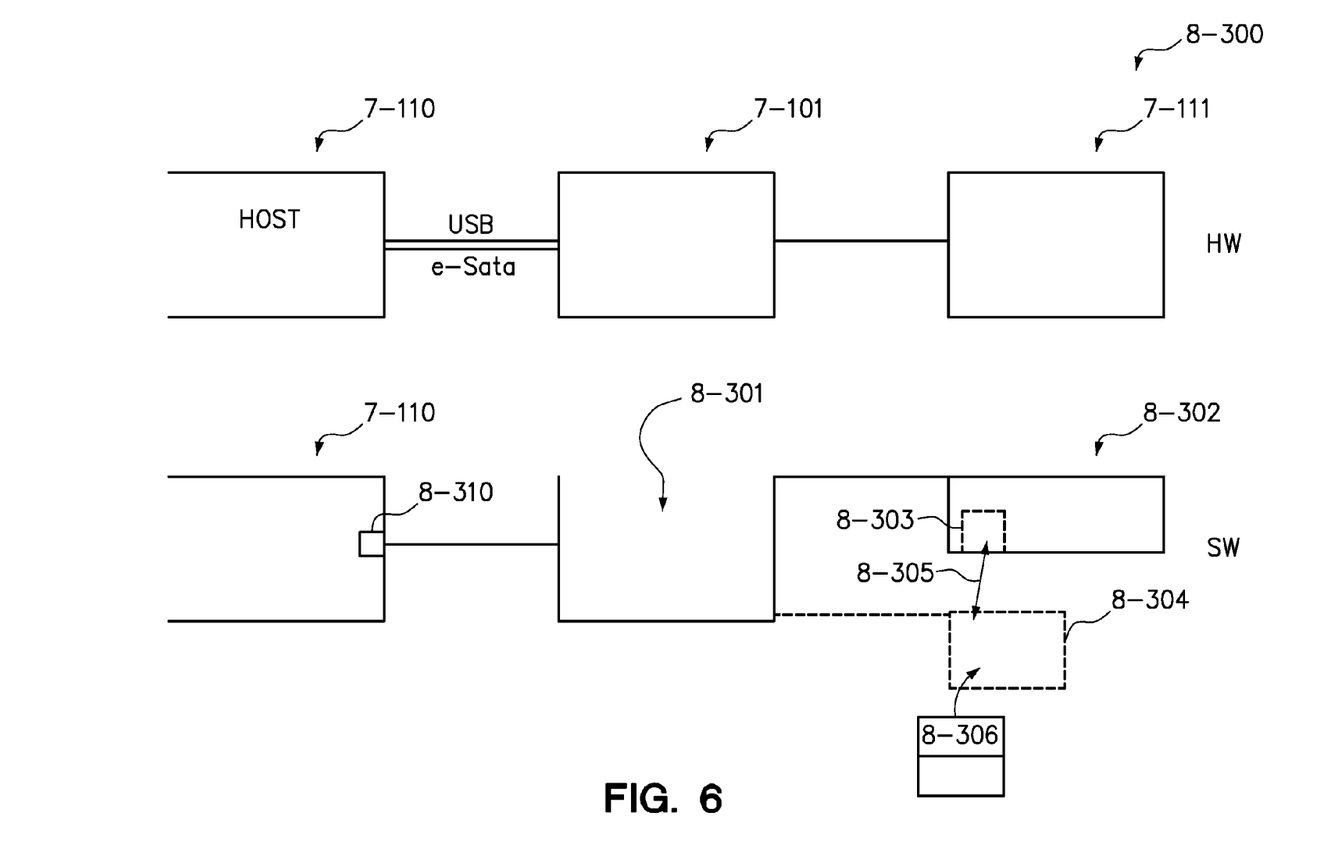
FIG. 6 is a block diagram of an embodiment of the invention.

FIG. 6 shows an overview of an exemplary system 8-300. The elements at the top half of the figure, as indicated by the label HW, are a simplified rendering of the system hardware. Host 7-110 has a USB connector and an eSATA connector. (The USB connector for power supply purposes, as described above, or in some cases, it may be the only connection.) Chip 7-101 connects to external SATA hard drive 7-111, and both would typically reside in an external enclosure (not shown here). The elements at the bottom half of the figure, as indicated by the label SW, are a simplified rendering of the software architecture of the same system with host 7-110. A driver 8-310 for the eSATA Atapi connection resides in host 7-110. Software instance 8-301 runs inside controller 7-101. It has the ability to present two devices: an .ISO file of virtual CD-ROM 8-304, which is physically stored on partition 8-303 of the drive 8-305, and which shares space on the physical drive with the other partition 8-302, a data drive that is initially locked. When the code 8-306, stored in the .ISO file 8-304, is executed, code 8-306 contains a security application that presents to a user attempting to log in a log-in procedure that requires some means of identification, such as some physical identification, such as RFID, fingerprint or other biometric identifier, etc. or a password (or both), or other type of identification. Once the identification requirement is satisfied, the application in code 8-306 sends a command to controller 7-101, which is executing software 8-301. Software 8-301 then unlocks the remainder of the physical drive 7-111 as usable partition 8-302, which is presented as a separate drive.

Figure 7:
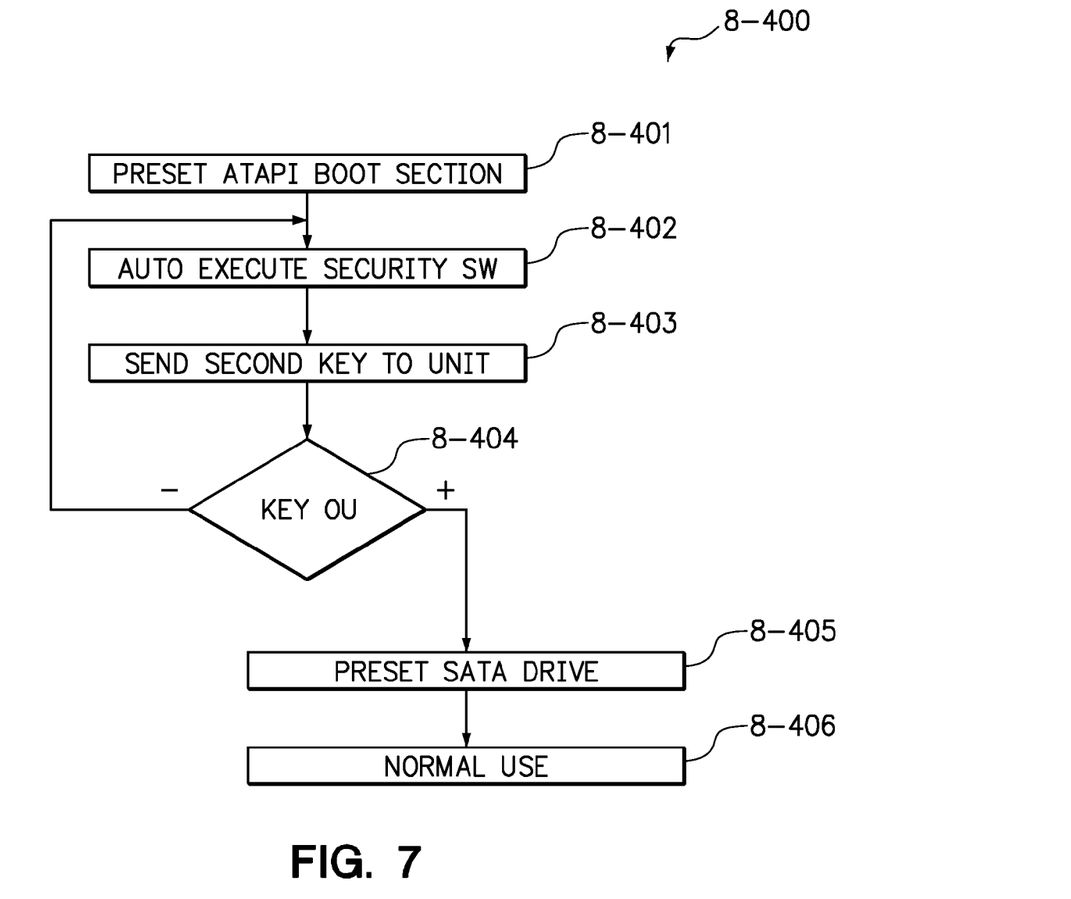
FIG. 7 is a flow diagram a presentation feature of present invention.

FIG. 7 shows an exemplary process 8-400 for implementation of the system according to one embodiment of the present invention. In step 8-401 the .ISO file is presented as a bootable CD-ROM to the operating system, such as Windows, MacroS, various types of Unix or Linux operating systems, etc. It is possible to have different versions of this software for different operating systems, such as Windows, MacroS, various Unix and Linux operating system, etc., so that for each operating system, appropriate security software may be loaded. In step 8-402, the security software auto-executes. Once the user has entered his identification, such as a password or other ID, in step 8-403 the system sends a security key to software instance 8-301, which in this example is of the type of software known as firmware, for authentication. At step 8-404, the process branches. If the authentication fails (−), the process loops back to step 8-402 and the security software executes again. If the authentication is successful (+), in step 8-405 the system unlocks and presents the SATA drive, which is the remaining partition 8-302 of the physical drive 7-111. Then in step 8-406, normal operations commence. Note that the virtual CD drive and the actual data drive are assigned different drive letters, and both drives may be shown as drives with removable media, with the media being inserted when the system unlocks the drive.

While the machine-readable medium is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. Examples of computer-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although embodiments have been described with reference to specific exemplary embodiments, it will be evident that various modifications and changes can be made to these embodiments without departing from the broader spirit and scope as set forth in the following claims. Accordingly, the specification and drawings are to be regarded in an illustrative sense rather than in a restrictive sense.

What is claimed is:

1. In a system comprising a computing device having an eSata port and an USB port, a controller connected to said eSata port and said USB port, and an external Serial Advanced Technology Attachment storage device connected to said controller, a method comprising:
   on controller startup, the controller presenting to a computing device via the USB port data from a first partition of the external Serial Advanced Technology Attachment storage device, as a Read Only Memory whereby the computing device is caused to assign to the first partition a drive letter and provide to the first partition read access;
   downloading from said controller into said computing device and causing the execution in said computing device an authentication process; and
   in response to receiving a valid authentication, presenting to the computing device a second partition of the external Serial Advanced Technology Attachment storage device as an eSata storage device, wherein the second partition remains invisible to the computing device until presented; and whereby after presentation the computing device is caused to assign to the second partition a drive letter and to provide to the first partition read/write access.

2. The method of claim 1, wherein the second partition of the external Serial Advanced Technology Attachment storage device is encrypted.

3. The method of claim 2, further including decrypting the second partition as part of the presentation step.

4. The method of claim 1, wherein the identity authentication process comprises verifying at least one of a RFID, a password, or a biometric identifier.

5. The method of claim 3, further comprising accessing an encryption key from the first partition of the Serial Advanced Technology Attachment storage device.

6. A system comprising:
   means, on controller startup, for the controller presenting to a computing device via the USB port data from a first partition of the external Serial Advanced Technology Attachment storage device, as a Read Only Memory, whereby the computing device is caused to assign to the first partition a drive letter and provide to the first partition read access;
   means for downloading from said controller into said computing device and causing the execution in said computing device of an authentication process; and
   means, in response to receiving a valid authentication, for presenting to the computing device a second partition of the external Serial Advanced Technology Attachment storage device as an eSata storage device, the second partition remaining invisible to the computing device until presented, and whereby after presentation the computing device is caused to assign to the second partition a drive letter and to provide to the first partition read/write access.

7. In a system comprising a computing device having a USB port and an external storage unit having a USB controller, a method comprising:
   on controller startup, the controller presenting to the computing device via the USB port data from a first partition of the external storage device as a Read Only Memory, whereby the computing device is caused to assign to the first partition a drive letter and provide to the first partition read access;
   causing the execution of an authentication process; and
   in response to receiving a valid authentication, the controller presenting to the computing device a second partition of the external storage device, wherein the second partition remaining invisible to the computing device until presented, and whereby after presentation the computing device is caused to assign to the second partition a drive letter and to provide to the first partition read/write access.

8. The method of claim 7, wherein the second partition of the storage device is encrypted.

* * * * *